E. A. JONES

Sept. 30, 1930. GAS FURNACE Re. 17,817

Original Filed Aug. 24, 1927 2 Sheets-Sheet 1

INVENTOR.
EDWIN A. JONES
BY
Morsell, Kearney & Morsell
ATTORNEYS.

E. A. JONES

Sept. 30, 1930. GAS FURNACE Re. 17,817

Original Filed Aug. 24, 1927 2 Sheets-Sheet 2

INVENTOR.
EDWIN A. JONES.

BY
Morsell, Keeney & Morsell,
ATTORNEYS.

Reissued Sept. 30, 1930

Re. 17,817

UNITED STATES PATENT OFFICE

EDWIN A. JONES, OF MILWAUKEE, WISCONSIN, ASSIGNOR TO L. J. MUELLER FURNACE COMPANY, OF MILWAUKEE, WISCONSIN, A CORPORATION OF WISCONSIN

GAS FURNACE

Original No. 1,657,125, dated January 24, 1928, Serial No. 215,124, filed August 24, 1927. Application for reissue filed July 14, 1930. Serial No. 467,987.

This invention relates to improvements in gas furnaces.

It is one of the objects of the present invention to provide a gas furnace in which the flue passages are arranged with removable baffles which cause the gases to scrub all of the flue surfaces to produce a maximum extraction of heat, the baffles also greatly reducing the volumetric content of the flues, thereby decreasing the violence of explosion which might occur within the furnace should collected gases become ignited.

A further object of the invention is to provide a gas furnace in which the flue passages are readily accessible from the front of the furnace for cleaning.

A further object of the invention is to provide a gas furnace constructed so as to have a long flue travel of a small volumetric content, and arranged so that the furnace may be built in half sections, the outer circumferences of which may be accurately ground to facilitate a gas tight assembly when said sections are bolted together.

A further object of the invention is to provide a gas furnace having a removable front flue passage baffle to prevent the products of combustion from short circuiting through the front cleaning extension.

A further object of the invention is to provide a gas furnace which is of very simple construction, is efficient in operation, is strong and durable, and is well adapted for the purposes described.

With the above and other objects in view, the invention consists of the improved gas furnace, and its parts and combinations, as set forth in the claims, and all equivalents thereof.

In the accompanying drawings in which the same reference characters indicate the same parts in all of the views.

Figure 1:
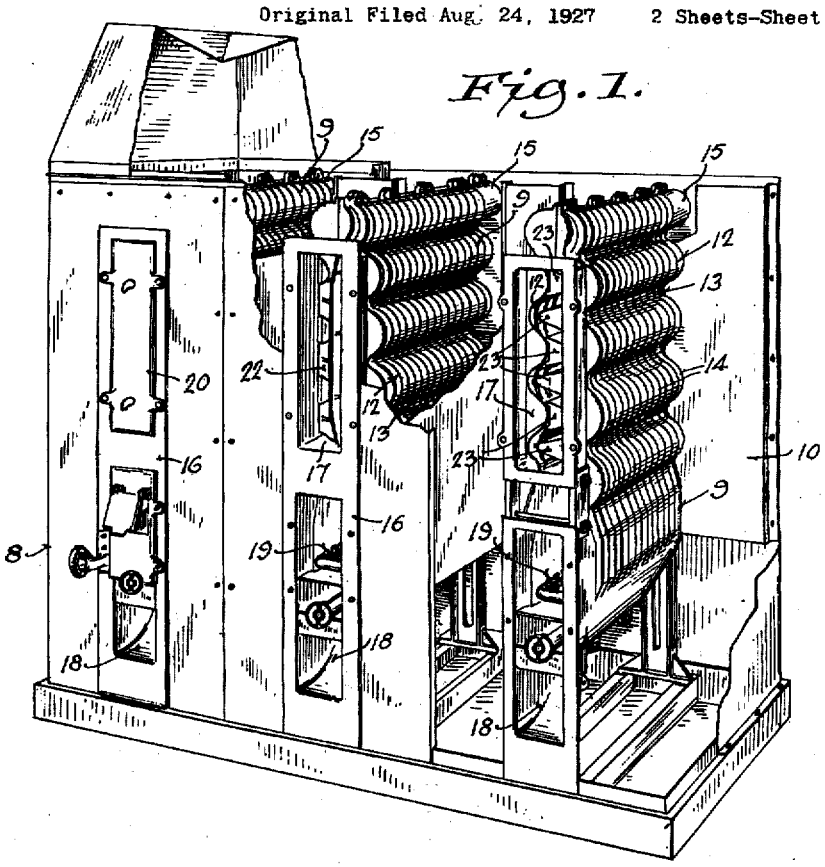
Fig. 1 is a perspective view of a three unit gas furnace constructed in accordance with the invention, parts being broken away to show details of construction.

Referring now more particularly to the drawings, it will appear that the gas furnace is designated generally by the numeral 8 and may be composed of any number of independent units 9 enclosed by a suitable casing 10, the furnace shown in Fig. 1 being composed of three units.

Figure 2:
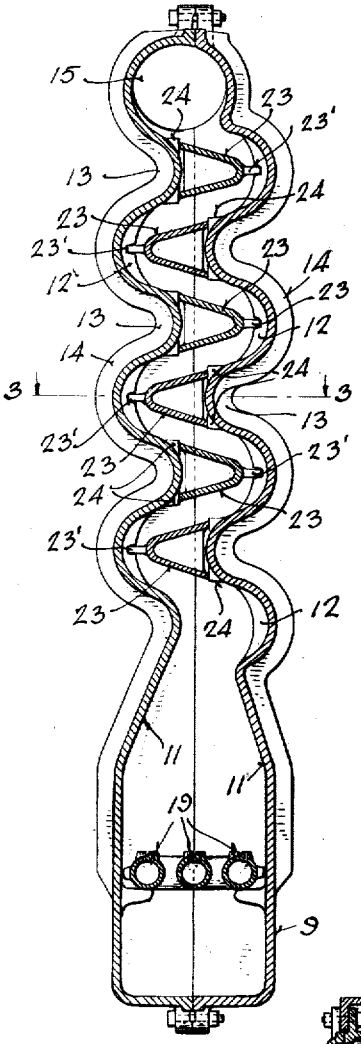
Fig. 2 is an enlarged vertical sectional view through a unit indicated on line 2—2 of Fig. 3.
Figure 4:
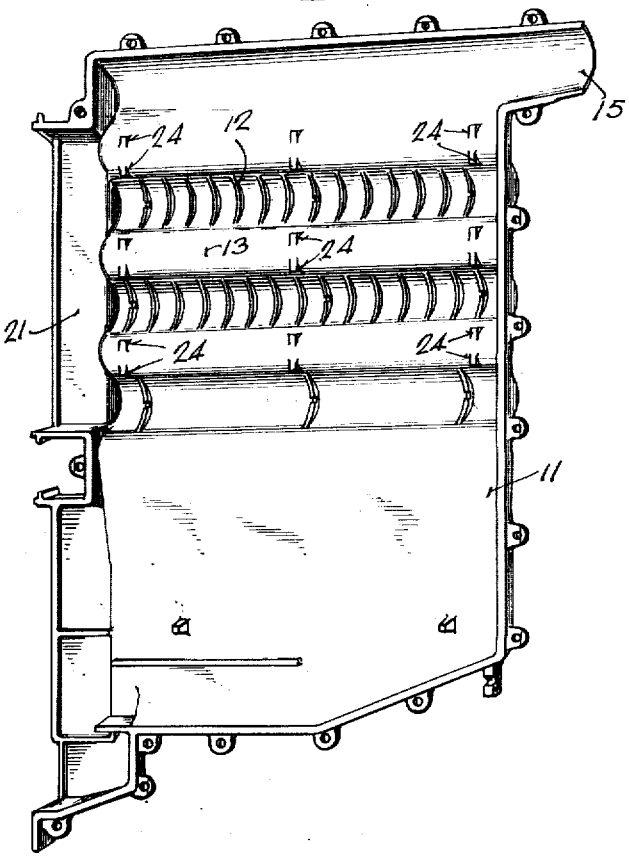
Fig. 4 is a detail view of a furnace unit half section.
Figure 3:
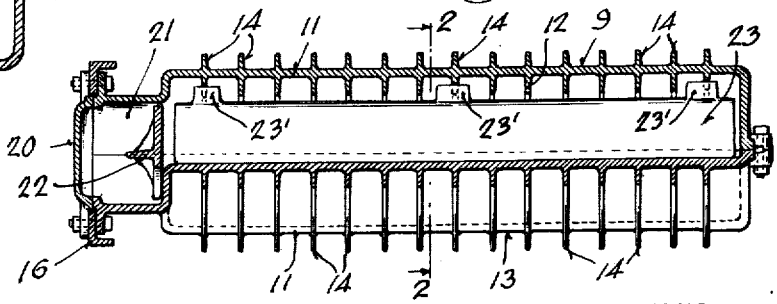
Fig. 3 is an enlarged cross sectional view of a unit indicated on line 3—3 of Fig. 2.

Each unit 9 is formed of a pair of complementary side wall members or sections 11, one of which is shown in detail in Fig. 4. The upper portions of said members 11 are provided with alternating rows of concaved and convex portions 12 and 13, respectively, forming corrugations, and the exteriors of said members are formed with fins or ribs 14, so that a large surface will be afforded for the heating of air by convection. Due to the construction of the unit side sections 11 the adjacent surfaces of each pair may be accurately ground and when they are assembled and bolted together, as shown in Figs. 2 and 3, a gas tight connection is formed, the space between said sections providing a flue. The rear ends of the flues are closed, except for an upper vent pipe connection 15. The front portion of each unit has an upper opening 17 and a lower opening 18 extending through the frame 16. The lower opening 18 is controlled by suitable removable plates to permit access to a burner 19 within the lower portion of the unit 9, while the upper opening 17 is normally closed by a door 20 controlling access to an upper forward flue cleaning extension 21, which cleaning extension directly registers with all portions of the flue and preferably extends from immediately above the burner chamber to substantially the top portion of the flue. Within the flue cleaning extension and against the front ends of the sections 11 a removable front baffle 22 is positioned, said baffle being shown in the center unit of Fig. 1, and also in Fig. 3. The purpose of the baffle 22 is to prevent the products of combustion from short circuiting through the front cleaning extension 21 from the flue and the removability of the baffle permits ready accessibility to the flue for cleaning.

Figure 5:
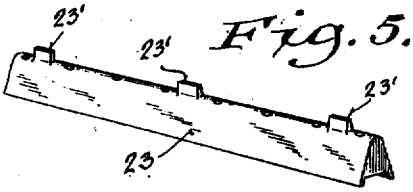
Fig. 5 is a detail perspective view of one of the flue passage baffles used.

By reference to Fig. 2, it will be seen that when the two sections 11 of a unit are connected, a vertically extending flue of serpentine shape is formed therebetween, cooperating complementary corrugations of the sections forming courses, which courses in their vertical relationship are staggered and are connected. It is desirable, however, that the flue opening be restricted or diminished as to volumetric content, and to that end a plurality of horizontally extending internal flue baffles 23 are provided. One of said baffles 23 is shown in detail in Fig. 5, and it will be seen to be triangular in cross section and is formed along one edge with projecting lugs 23.′ Said baffles may be either cast as solid members, or as shells, and in practice it has been found desirable to form the same as shells, and fill the interiors with asbestos or the like. It will be noted that the baffles 23 are not integral with the unit sections 11, but are inserted in the flue opening between opposed concave and convex portions of the walls and are removably held in position by the engagement of the lugs 23′ with the fins 14, and also by lugs 24 cast on the inner surfaces of the sections 11 which engage the opposite sides of the baffles.

It will, therefore, be seen that the improved gas furnace is composed of any number of units, and in each unit a serpentine like flue is provided above the burners. By reference to Fig. 1 it will appear that each pair of adjacent units is separated by a thin, flat, vertical radiation shield. Said shields are positioned preferably equidistant between adjacent units and extend from an elevation in accord with the upper portions of the burner chambers to the upper portions of the units. Each shield secures a greater heat emission per square foot of heating surface presented, by increasing radiation from adjacent sections, increases heat emission of adjacent sections by securing better scrubbing action of the air columns passing through the furnace, and also equalizes and causes an even distribution of air passing through the units served by the shield. Due to the baffles 23, the space between the flue walls is greatly restricted, with the result that the gases will scrub the unit surfaces, insuring a maximum extraction of heat. The baffles also greatly reduce the volumetric content of the flues and thereby decrease the violence of explosions which might occur within the flues from the collection and ignition of unburned gases. Each unit has a long flue travel and because of the fact that the baffles are not integral with the unit sections, the units may be built in half sections and so formed that the entire outer surfaces may be accurately ground, whereby the sections may be bolted together around their outer circumferences and form a gas tight fit. Also, the accessibility of the flues from the furnace front for cleaning is of great advantage. The gas furnace is furthermore of simple and novel construction, and is well adapted for the purposes described.

What I claim as my invention is:

1. A gas furnace, comprising a unit formed with a flue opening, and an independent, removable baffle member mounted within said flue opening.

2. A gas furnace, comprising a heating unit composed of a pair of secured together sections, a curved flue opening being formed therebetween, and a plurality of independent baffle members positioned between said sections and restricting said flue opening.

3. A gas furnace, comprising a heating unit formed of a pair of secured together sections, a serpentine like vertically extending flue opening being formed therebetween, a burner positioned in the lower portion of said unit and in register with the flue opening, and a plurality of independent, removable baffle members positioned between said sections and restricting the volumetric content of said flue opening.

4. A gas furnace, comprising a heating unit formed of a pair of bolted together sections, a serpentine like vertically extending flue opening being formed therebetween, a burner positioned in the lower portion of said unit and in register with the flue opening, and a plurality of spaced, independent, horizontally extending removable baffle members positioned in staggered relation between said sections and restricting the volumetric content of said flue opening.

5. A gas furnace, comprising a heating unit formed of a pair of secured together sections, a curved flue opening being formed therebetween, said heating unit having a cleaning opening in its front portion affording access to said flue opening, a door for said cleaning opening, and a plurality of removable baffle members between said unit sections and restricting the flue opening.

6. A gas frame, comprising a heating unit formed of a pair of secured together sections, a curved flue opening being formed therebetween, a front cleaning extension formed on said unit registering with said flue opening and having a forward opening therein, a door for said forward opening, and a plurality of removable baffle members between said unit sections and restricting the flue opening.

7. A gas furnace, comprising a heating unit formed of a pair of ribbed sections secured together, a curved flue opening being formed therebetween, a front cleaning extension projecting from said flue opening and having a cleaning opening therein, a removable baffle member within said extension and engaging said section ribs, and a plurality of spaced removable baffle members between said unit sections and restricting the flue opening.

8. A gas furnace, comprising a heating unit formed of a pair of bolted together, ribbed sections, a serpentine like vertically extending flue opening being formed therebetween, a front cleaning extension formed in said unit and registering with said flue opening, said extension having an opening, a door for said opening, a removable baffle member within said extension adjacent said section ribs, a burner within the lower portion of said unit and in register with the flue opening, and a plurality of spaced, independent, horizontally extending, removable, triangular baffle members positioned in staggered relation between said sections and restricting the volumetric content of said flue opening.

9. A gas furnace, comprising a heating unit formed of a pair of bolted together, ribbed sections, a serpentine like vertically extending flue opening being formed therebetween, a front cleaning extension formed in said unit and registering with said flue opening, and a door for said opening.

10. A gas furnace, comprising a heating unit having a curved flue opening, and a plurality of independent and spaced baffle members within said flue opening and restricting the same.

11. A gas furnace, comprising a heating unit formed of a pair of bolted together sections, a serpentine like vertically extending flue opening being formed therebetween, a front cleaning extension formed in said unit and registering with said flue opening throughout substantially the entire height of the same, and a door for said opening.

12. A gas furnace, comprising a heating unit formed of a pair of complementary, secured together sections, a vertically extending, curved flue opening being formed therebetween, said sections also forming a lateral cleaning extension in registration with said flue opening and affording direct access to any portion of said curved flue opening, and a door for said extension.

13. A gas furnace, comprising a unit formed of a pair of complementary, secured together sections, a combustion chamber being formed between the lower portions of said sections, and a vertically extending flue opening of compound curvature being formed between said sections above the combustion chamber, said unit also being formed with an enclosure forwardly of the flue opening registering with the same and affording direct access to the flue opening throughout substantially its entire height for cleaning purposes, and a door for said enclosure.

14. In a heating apparatus, a unit formed of a pair of complementary sections secured together in enclosure forming relation to provide in said unit a lower combustion chamber, a vertically extending serpentine-like flue thereabove, and a hollow extension above said combustion chamber and projecting slightly outwardly of the flue throughout substantially its entire height and in registration with the same for access for cleaning, each section being formed with a lower, semi-combustion chamber forming portion, a corrugated semi-flue forming thereabove, and a slightly forwardly extending semi-cleaning extension forming portion extending lengthwise of the section substantially the vertical distance of the flue forming portion, each section being generally of U-formation in transverse and longitudinal sections.

15. A gas furnace, comprising a heating unit formed of a pair of bolted together corrugated sections, which in secured together relation have their respective corrugations in staggered relation and laterally offset, a serpentine-like flue opening being formed between said sections and each complementary pair of corrugations forming a course, the adjacent ends of which courses communicate to provide a serpentine-like vertically extending passage, the courses in their vertical relationship being staggered, a front cleaning extension formed in said unit and directly registering with at least two of said courses, and a door for said extension.

16. In a heating apparatus, in combination, a pair of spaced-apart heating units, each unit being formed of a pair of corrugated sections, a serpentine-like vertically extending flue opening being formed therebetween, and a clean-out extension being formed forwardly of said flue opening and in registration with the same throughout substantially its entire height, a casing enclosing said heating units, and a radiation shield interposed within said casing between the units.

17. In a heating apparatus, in combination, a pair of spaced-apart heating units, each unit being formed of a pair of corrugated sections, a serpentine-like vertically extending flue opening being formed therebetween, and a clean-out extension being formed forwardly of said flue opening and in registration with the same throughout substantially its entire height, a casing enclosing said heating units, and a thin, flat surfaced, radiation shield interposed within said casing vertically, substantially equidistant between said units.

18. In a heating apparatus, in combination, a pair of spaced-apart heating units, each unit being formed of a pair of corrugated, complementary sections, a combustion chamber being formed between lower portions of said sections, and a serpentine-like, vertically extending flue opening being formed between said sections above the combustion chamber, each unit also being formed with an enclosure forwardly of the flue opening registering with the same, a casing enclosing said heating units, and a flat surfaced radiation shield within said casing and positioned vertically, substantially equidistant between said units and extending from the upper portions of the combustion chambers to the top portion of the flues.

19. In a heating apparatus, in combination, a pair of spaced-apart heating units, each unit being formed of a pair of corrugated, complementary sections, a combustion chamber being formed between lower portions of said sections, and a serpentine-like, vertically extending flue opening being formed between said sections above the combustion chamber, each unit also being formed with an enclosure forwardly of the flue opening registering with the same and having an exterior opening, a casing enclosing said units with the exterior openings of said enclosures being accessible from the exterior of the casing, doors for said openings of the enclosures, and a flat surfaced radiation shield within said casing and positioned vertically, substantially equidistant between said units and extending from the upper portions of the combustion chamber to the top portions of the flues.

In testimony whereof, I affix my signature.

EDWIN A. JONES.

DISCLAIMER

Re. 17,817.—*Edwin A. Jones*, Milwaukee, Wis. GAS FURNACE. Patent dated September 30, 1930. Disclaimer filed June 16, 1933, by the assignee, *L. J. Mueller Furnace Company*.

Hereby enters this disclaimer to that part of the claims in said specification which are in the following words, to wit:

"9. A gas furnace, comprising a heating unit formed of a pair of bolted together, ribbed sections, a serpentine like vertically extending flue opening being formed therebetween, a front cleaning extension formed in said unit and registering with said flue opening, and a door for said opening."

"11. A gas furnace, comprising a heating unit formed of a pair of bolted together sections, a serpentine like vertically extending flue opening being formed therebetween, a front cleaning extension formed in said unit and registering with said flue opening throughout substantially the entire height of the same, and a door for said opening.

"12. A gas furnace, comprising a heating unit formed of a pair of complementary, secured together sections, a vertically extending, curved flue opening being formed therebetween, said sections also forming a lateral cleaning extension in registration with said flue opening and affording direct access to any portion of said curved flue opening, and a door for said extension.

"13. A gas furnace, comprising a unit formed of a pair of complementary, secured together sections, a combustion chamber being formed between the lower portions of said sections, and a vertically extending flue opening of compound curvature being formed between said sections above the combustion chamber, said unit also being formed with an enclosure forwardly of the flue opening registering with the same and affording direct access to the flue opening throughout substantially its entire height for cleaning purposes, and a door for said enclosure.

"14. In a heating apparatus, a unit formed of a pair of complementary sections secured together in enclosure forming relation to provide in said unit a lower combustion chamber, a vertically extending serpentine-like flue thereabove, and a hollow extension above said combustion chamber and projecting slightly outwardly of the flue throughout substantially its entire height and in registration with the same for access for cleaning, each section being formed with a lower, semi-combustion chamber forming portion, a corrugated semi-flue forming portion thereabove, and a slightly forwardly extending semi-cleaning extension forming portion extending lengthwise of the section substantially the vertical distance of the flue forming portion, each section being generally of U-formation in transverse and longitudinal sections.

"15. A gas furnace, comprising a heating unit formed of a pair of bolted together corrugated sections, which in secured together relation have their respective corrugations in staggered relation and laterally offset, a serpentine-like flue opening being formed between said sections and each complementary pair of corrugations forming a course, the adjacent ends of which courses communicate to provide a serpentine-like vertically extending passage, the courses in their vertical relationship being staggered, a front cleaning extension formed in said unit and directly registering with at least two of said courses, and a door for said extension."

[*Official Gazette July 11, 1933.*]